UNITED STATES PATENT OFFICE.

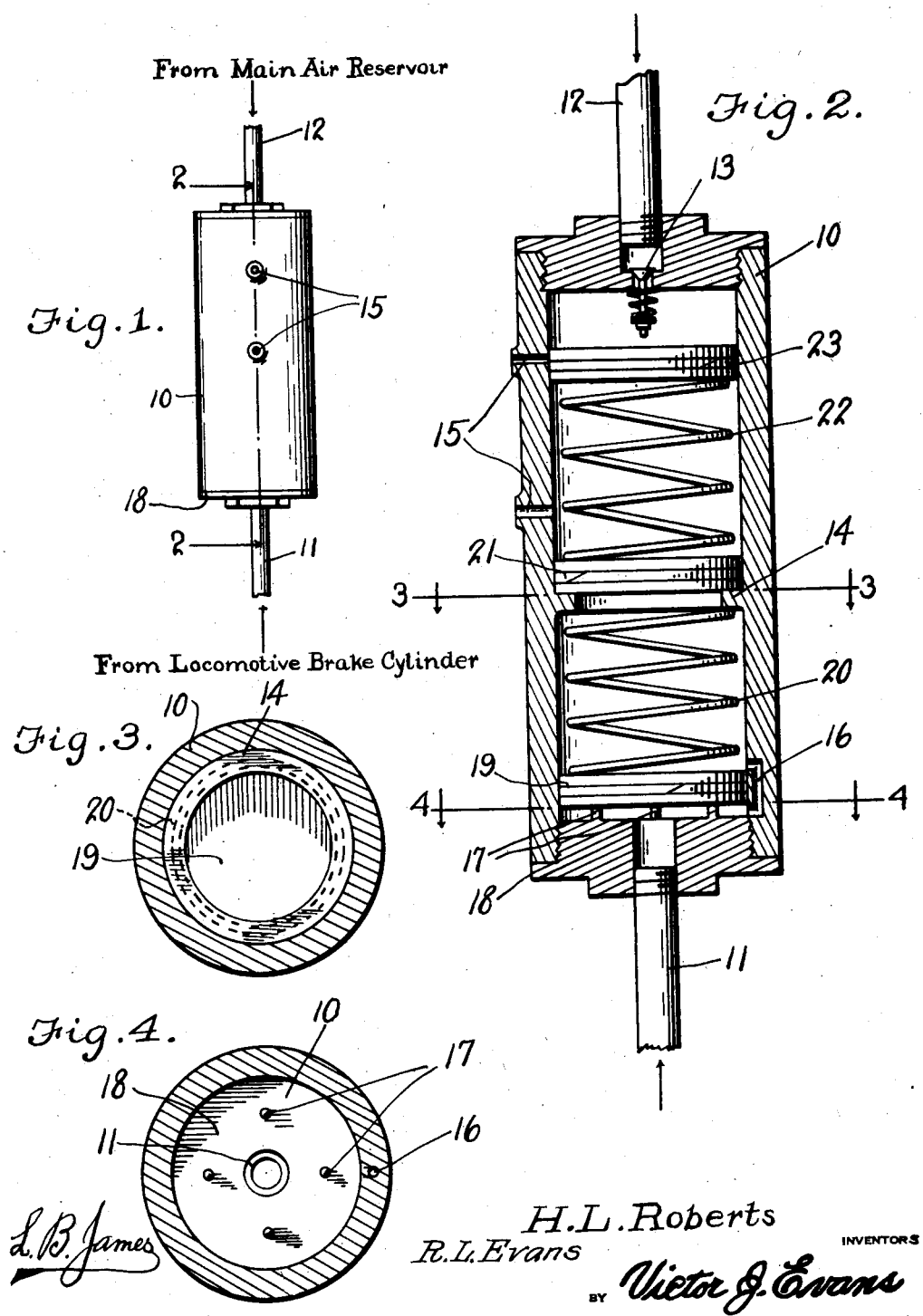

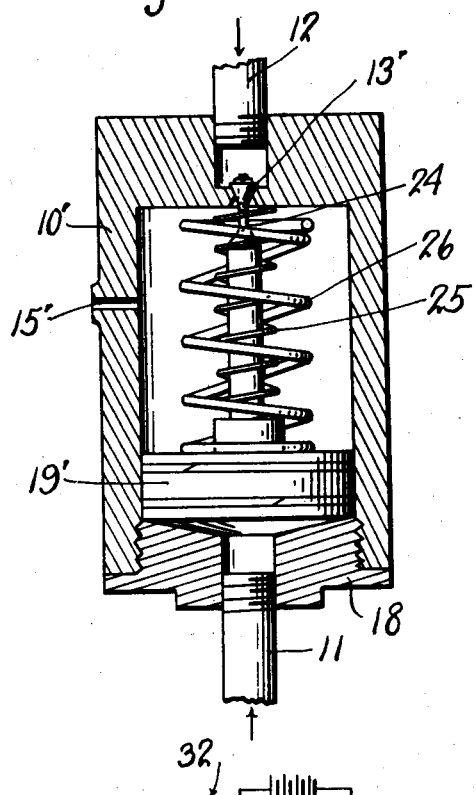
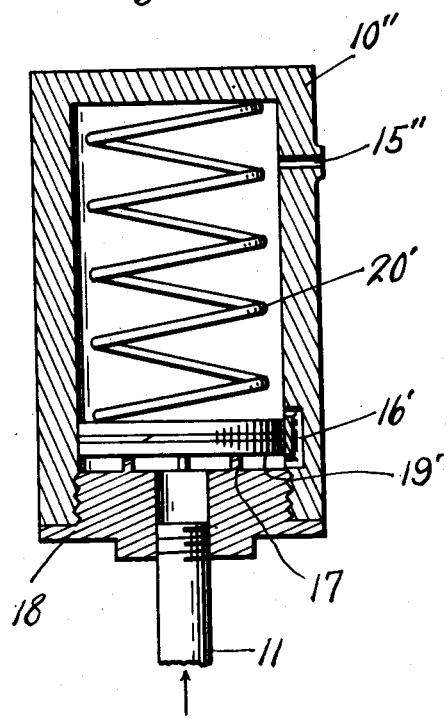
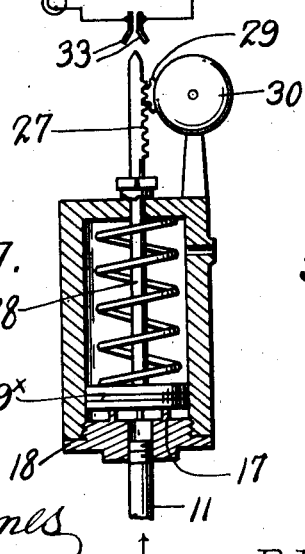
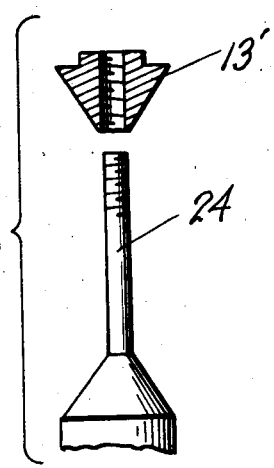

ROBERT LEE EVANS AND HUGH LEONARD ROBERTS, OF ROANOKE, VIRGINIA.

VALVE.

1,388,179.     Specification of Letters Patent.     Patented Aug. 23, 1921.

Application filed November 10, 1920. Serial No. 423,202.

*To all whom it may concern:*

Be it known that we, ROBERT L. EVANS and HUGH L. ROBERTS, both citizens of the United States, residing at Roanoke, in the county of Roanoke and State of Virginia, have invented new and useful Improvements in Valves, of which the following is a specification.

This invention relates to signal means for notifying the engineer that the engine brakes have been applied through leakage of air to the brake cylinder, the principal object of the invention being to provide means, actuated by the pressure in the brake cylinders caused by said leakage, to sound an alarm or show a visual signal to call the engineer's attention to the fact that the brakes have been accidentally applied.

Another object of the invention is to so form the device that the signal may be given if the brake pressure has leaked off after having been applied by the engineer for holding the brakes in applied position.

A further object of the invention is to provide means whereby the device will be rendered inactive and will not interfere with the application of the brakes when the air pressure has been turned by the engineer into the brake cylinders.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1 is an elevation of one form of the invention.

Fig. 2 is a section on line 2—2 of Fig. 1.
Fig. 3 is a section on line 3—3 of Fig. 2.
Fig. 4 is a section on line 4—4 of Fig. 2.
Fig. 5 is a longitudinal sectional view of a modified form of the invention.
Fig. 6 is a like view of another form.
Fig. 7 is a similar view of still another form.
Fig. 8 is a detail sectional view of the means for adjusting the valve of Fig. 5.

In locomotives as now constructed there is danger of the air pressure leaking into the brake cylinders and applying the brakes with sufficient pressure to cause the tires to heat and become loose on the wheels. In most instances this is done before the engine crew discover the fact that the brakes are applied until after the damage has been done. Serious accidents have been caused in this way and the expense and delays resulting from loose tires are great.

It is the object of the present invention to provide means to notify the engineer as soon as the brakes have been applied by this leakage of air so that he can immediately act to remove the brakes and thus prevent the slipping of the tires.

The drawings show several ways of carrying out our invention. The form of the invention shown in Figs. 1, 2, 3 and 4 comprises a cylinder 10 which has its lower end connected with the locomotive brake cylinder by means of the pipe 11 and its upper end connected with the main air reservoir by the pipe 12. A spring controlled valve 13 normally closing communication between the main air reservoir and the cylinder. An annular rim 14 is formed on the interior wall of the cylinder intermediate its ends and above the rim a pair of ports 15 are formed in the cylinder. The lower end of the cylinder is provided with a bypass 16 and pegs 17 project upwardly from the lower closing cap 18 of the cylinder. A piston 19 is normally held on said pegs by means of the spring 20 which has its upper end bearing against the rim 14. In this position of the cylinder 19 the bypass 16 connects the spaces above and below the piston. A piston 21 normally rests upon the upper face of rim 14 and this piston supports a coil spring 22 which in turn supports a piston 23. The spring 22 is of such strength as to normally hold the piston 23 in a position covering the upper port 15 and in this position said piston is spaced from the stem of valve 13.

If the compressed air should leak into the brake cylinder it would pass into cylinder 10 through pipe 11 and this air will pass to the space above the piston 19 by way of the bypass 16. As spring 20 is of greater strength than spring 22 the pressure within the lower part of the cylinder, when the same is sufficient to overcome the weight of the pistons and spring in the upper part of the cylinder, will raise the piston 21, the spring 22 and piston 23 until said piston 23 strikes valve 13 and opens the same. As soon as this valve is open the air from the main reservoir will rush into the upper end of the cylinder and this air acting against piston 23 will lower this piston and piston 21 and will depress piston 23 below the upper port 15 and the compressed air rushing through said port will make sufficient noise to attract the engineer's attention and thus notify him that there is pressure in the brake cylinder. It will of course be understood that the valve 13 is only open for a short time for as soon as the pressure lowers the piston 23 said valve 13 is closed. However, as soon as the pressure escapes through the port 15 the low pressure in the brake cylinder again raises the pistons and opens valve 13 again so that the action of the device is intermittent and will keep up until the pressure in the brake cylinder is removed.

When the engineer turns on the pressure to the brake cylinder to apply the brakes the high pressure in said cylinder will act to raise piston 19 above the bypass 16 and thus prevent said pressure from acting on the pistons 21 and 23.

It will also be seen that after the brakes have been applied and the compressed air in the brake cylinder should leak out so as to free the brakes this fact would also be called to the attention of the engineer as the device would operate as before described.

In the modification shown in Figs. 5 and 8 only one piston 19' is used. This piston is provided with a stem 24 which has a screw threaded upper end to receive the valve 13' which controls the communication between the cylinder 10' and the main air reservoir. The valve 13' is held to its seat and the piston 19' in its lowest position by means of a coil spring 25 which is placed on the stem 24. A heavier spring 26 is also placed around said stem and normally this heavier spring has its upper end spaced from the top of the cylinder.

If the air should leak into the brake cylinder it will act on piston 19' and when the pressure becomes greater than the strength of the spring 25 the piston in valve 13' will raise, thus permitting the air from the main reservoir to rush into the cylinder and through its port 15' to give the alarm. When the brakes have been applied by the engineer the excess pressure within the brake cylinder will act to raise piston 19' but this piston is soon returned to its normal position by the air from the main reservoir and the spring 26.

In the form shown in Fig. 6 the cylinder 10'' is not connected with the main air reservoir as in this form the air from the brake cylinder is used to give the signal as said air will pass into the upper part of the cylinder 10'' through the bypass 16' and escape through the port 15'', thus giving the signal. When the brakes have been applied by the engineer the excess pressure in the brake cylinder will raise the piston 19'' above the bypass and thus prevent the air from escaping through the port 15''. The spring 20' holds the piston 19' in its normal position.

In the form shown in Fig. 7 the parts are arranged somewhat similar to the modification shown in Fig. 6 with the exception of the bypass and in addition a rack 27 is connected with the stem 28 of the steam $19^x$, said piston passing through the upper end of the cylinder. This rack engages with the hammer 29 of a bell 30 so that when said rack is moved by the action of the air on the piston the bell will be rung to give the alarm.

We may also operate an electric lamp 32, the circuit of which is closed by the upper end of rack 27 engaging the contacts 33.

It will thus be seen that the brakes cannot creep on without the engineer being aware of it and the device will not interfere with the proper application of the brakes.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:—

1. A device of the class described comprising a cylinder connected with the brake cylinder, signal means associated with the first mentioned cylinder and means in said first mentioned cylinder for operating the signal means, said means being actuated by the pressure in the brake cylinder caused by the leakage of air therein and said means being rendered inactive when the full pressure is admitted to the brake cylinder to apply the brakes.

2. A device of the class described comprising a cylinder connected with the brake cylinder and with the main air reservoir, said cylinder having a port therein and means within the cylinder and actuated by the pressure in the brake cylinder caused by the leakage of air thereto to permit some of the air in the main reservoir to escape through the port, said means being rendered inactive when the full pressure is admitted to the brake cylinder to apply the brakes.

3. A device of the class described comprising a cylinder having an outlet port therein and a bypass, a pipe connecting said cylinder with the brake cylinder, a piston in the first mentioned cylinder and normally located between the ends of the bypass for permitting the pressure in the brake cylinder caused by the leakage of air thereto to pass to the space above the piston, signal means actuated by the air passing into said space, and spring means for holding said piston in its normal position but permitting the main air reservoir pressure in the brake cylinder to raise the piston above the bypass.

4. A device of the class described comprising a cylinder, a pipe connecting the lower end thereof with the brake cylinder, a pipe connecting the upper end with the main air reservoir, a valve controlling communication between said main air reservoir pipe and the cylinder, said cylinder having a bypass therein and an outlet port, a piston in the cylinder, a spring for normally holding the same between the ends of the bypass, a pair of pistons in the cylinder arranged above the first mentioned piston, a spring separating the pistons of the pair, said pair of pistons being arranged to be lifted by the compressed air in the brake cylinder caused by the leakage of air thereto to open the valve in the main air reservoir pipe to permit said air to flow into the cylinder to depress the pair of pistons and to escape through the outlet port.

5. A device of the class described comprising a cylinder, a piston therein, a pipe connecting the lower end of the cylinder with the brake cylinder, projections on the bottom of said cylinder for holding the piston above said bottom for permitting the air from the brake cylinder to enter the lower part of the cylinder, a signal and means for actuating the signal when the piston is raised by the pressure in the brake cylinder.

In testimony whereof we affix our signatures.

ROBT. LEE EVANS.
HUGH LEONARD ROBERTS.